US007145538B2

(12) United States Patent
Yamakawa et al.

(10) Patent No.: US 7,145,538 B2
(45) Date of Patent: Dec. 5, 2006

(54) LIQUID CRYSTAL DISPLAY DEVICE AND METHOD FOR DRIVING A LIQUID CRYSTAL DISPLAY

(75) Inventors: Eiji Yamakawa, Sanda (JP); Tsukasa Yagi, Kobe (JP); Naoki Masazumi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/866,287

(22) Filed: May 25, 2001

(65) Prior Publication Data

US 2001/0048414 A1 Dec. 6, 2001

(30) Foreign Application Priority Data

May 29, 2000 (JP) ............................ 2000-158570
May 7, 2001 (JP) ............................ 2001-136725

(51) Int. Cl.
*G09G 3/36* (2006.01)
*G09G 5/00* (2006.01)
*C09K 19/02* (2006.01)

(52) U.S. Cl. ......................... 345/96; 345/209; 349/169

(58) Field of Classification Search ............ 345/94–96; 349/169, 35
See application file for complete search history.

(56) References Cited

U.S. PATENT DOCUMENTS 5,748,277 A 5/1998 Huang et al. ............... 349/169
6,236,385 B1 * 5/2001 Nomura et al. ............... 345/95

* cited by examiner

*Primary Examiner*—Kent Chang
*Assistant Examiner*—Srilakshmi K Kumar
(74) *Attorney, Agent, or Firm*—Sidley Austin LLP

(57) ABSTRACT

A liquid crystal display device which carries out matrix driving of a liquid crystal layer by applying AC pulses to the liquid crystal layer through a plurality of scan electrodes and a plurality of data electrodes which face and cross each other. A method of driving such a liquid crystal display comprises a reset step of applying a reset pulse to liquid crystal to reset the liquid crystal to an initial state, a selection step of applying a selection pulse to the liquid crystal to select a final state of the liquid crystal, an evolution step of applying an evolution pulse to the liquid crystal to cause the liquid crystal to evolve to the selected final state. The reset pulse and the evolution pulse have alternating cycles which are longer than that of the selection pulse, and the adjustment of the alternating cycles of the reset pulse and of the evolution pulse are made by changing the pulse waveform applied to each of the scan electrodes.

10 Claims, 6 Drawing Sheets

LIQUID CRYSTAL DISPLAY DEVICE AND METHOD FOR DRIVING A LIQUID CRYSTAL DISPLAY

This application is based on Japanese patent application Nos. 2000-158570 and 2001-136725, the contents of which are hereby incorporated by reference.

BACKGROUND OF THE INVENTION

1. Field of the Invention

The present invention relates to a liquid crystal display device and a method for driving a liquid crystal display, and more particularly to a liquid crystal display device which applies AC pulses to a liquid crystal layer through a plurality of scan electrodes and a plurality of data electrodes which face and cross each other and a method for driving a liquid crystal display.

2. Description of Related Art

In recent years, various kinds of reflective type liquid crystal displays which use liquid crystal which exhibits a cholesteric phase at room temperature (mainly, chiral nematic liquid crystal) have been studied and developed into media for reproducing digital information into visual information because such liquid crystal displays have advantages of consuming little electric power and of being fabricated at low cost. However, it is well known that such liquid crystal displays with a memory effect have a demerit that the driving speed is low.

In order to solve this problem, U.S. Pat. No. 5,748,277 disclosed a method of driving such a liquid crystal display. FIG. 6 shows a driving voltage waveform used in the method disclosed by this prior art.

Referring to FIG. 6, the driving method disclosed by U.S. Pat. No. 5,748,277 is described. The driving method comprises a reset step (1) of resetting liquid crystal to an initial state, a selection step (2) of selecting the final state of the liquid crystal, an evolution step (3) of causing the liquid crystal to evolve to the selected final state and a display step (4) of displaying an image. In this method, the selection step (2) is relatively short, and this method is suited for a high-speed drive.

Generally, continuous application of a DC voltage to liquid crystal causes problems such as degradation of liquid crystal molecules. For this reason, it is preferred that liquid crystal is driven by AC pulses.

The above-mentioned U.S. Pat. No. 5,748,277 disclosed a driving voltage waveform which uses AC pulses. According to this prior art, however, the number of inverting the polarity of a pulse voltage applied to liquid crystal is extremely large, which increases the consumption of electric power.

SUMMARY OF THE INVENTION

An object of the present invention is to provide an improved liquid crystal display device and an improved liquid crystal display driving method in which the above-described problem is solved.

Another object of the present invention is to provide a liquid crystal display device and a liquid crystal display driving method in which the consumption of electric power can be reduced easily.

Further, another object of the present invention is to provide a liquid crystal display device and a liquid crystal display driving method in which a high-speed drive is possible while the consumption of electric power can be reduced more.

The present invention relates to a method for driving a liquid crystal display by applying AC pulses to a liquid crystal layer through a plurality of scan electrodes and a plurality of data electrodes which face and cross each other, in which the scan electrodes are selected for scanning successively at specified time intervals. A first method according to the present invention comprises: a reset step of applying a reset pulse, which is to reset liquid crystal of the liquid crystal layer to a predetermined state, to an area of the liquid crystal layer that corresponds to a selected one of the scan electrodes; and a selection step of applying a selection pulse, which is to select a final state of the liquid crystal, to the area of the liquid crystal after the reset step, and in the first method, a pulse applied to the selected one of the scan electrodes during the reset step has an amplitude which is larger than a maximum amplitude of pulses applied to each of the data electrodes and has a polarity maintaining period which is longer than that of the selection pulse, so that the reset pulse has an alternating cycle which is longer than that of the selection pulse.

A second method according to the present invention comprises: a selection step of applying a selection pulse, which is to select a final state of the liquid crystal, to an area of the liquid crystal layer that corresponds to a selected one of the scan electrodes; and an evolution step of applying an evolution pulse, which is to cause the liquid crystal to evolve to the selected final state, to the area of the liquid crystal layer; and in the second method, a pulse applied to the selected one of the scan electrodes during the evolution step has an amplitude which is larger than a maximum amplitude of pulses applied to each of the data electrodes and has a polarity maintaining period which is longer than that of the selection pulse, so that the evolution pulse has an alternating cycle which is longer than that of the selection pulse.

The first method may further comprise an evolution step of applying an evolution pulse, which is to cause the liquid crystal to evolve to the selected final state, to the area of the liquid crystal layer. In this case, a pulse applied to the selected one of the scan electrodes during the evolution step may have an amplitude which is larger than the maximum amplitude of the pulses applied to each of the data electrodes and have a polarity maintaining period which is longer than that of the selection pulse, so that the evolution pulse may have an alternating cycle which is longer than that of the selection pulse.

The second method may further comprise a reset step of applying a reset pulse, which is to reset liquid crystal of the liquid crystal layer to a predetermined state, to the area of the liquid crystal layer.

Pulse waveforms applied to the scan electrodes can be controlled independently of one another without influencing one another. In these methods, by changing the pulse waveform applied to each of the scan electrodes, the alternating cycle of the reset pulse and/or the alternating cycle of the evolution pulse is/are set longer than the alternating cycle of the selection pulse. Thereby, the number of polarity inversions in the reset step and the number of polarity inversions in the evolution step can be reduced, which results in a reduction in consumption of electric power. Also, it is not necessary to complicate the pulse waveform applied to each of the data electrodes, which is effective to suppress crosstalk.

In these methods, the alternating cycle of the reset pulse or the alternating cycle of the evolution pulse is set sufficiently long to prevent the liquid crystal from being polarized. Thereby, an exactly desired voltage acts on the liquid crystal, and degradation in display performance can be prevented. Also, the liquid crystal display can be prevented from changing its characteristics.

In these methods, the time intervals to select the scan electrodes successively are determined based on a width defined by the selection pulse.

Further, preferably, the pulses applied to each of the data electrodes, even at the maximum, are lower than a threshold to change the state of the liquid crystal so that crosstalk can be suppressed.

The liquid crystal to be driven by these methods may be of a kind which exhibits a cholesteric phase having a selective reflective characteristic. In this case, the liquid crystal may further exhibit bistability between a planar state and a focal-conic state.

A liquid crystal display device according to the present invention comprises a driver which carries out one of the above-described methods. Such a liquid crystal display device achieves a reduction in consumption of electric power, suppression of crosstalk and prevention of changes of the liquid crystal display in characteristics.

BRIEF DESCRIPTION OF THE DRAWINGS

These and other objects and features of the present invention will be apparent from the following description with reference to the accompanying drawings, in which:

FIG. 1 is a sectional view of a liquid crystal display which a driving method according to the present invention is adaptable for;

DETAILED DESCRIPTION OF THE PREFERRED EMBODIMENTS

Embodiments of a liquid crystal display device and a liquid crystal display driving method according to the present invention are described with reference to the accompanying drawings.

Liquid Crystal Display: See FIG. 1

First, a liquid crystal display which a driving method according to the present invention is adaptable for is described. The liquid crystal display comprises liquid crystal which exhibits a cholesteric phase.

Figure 1:
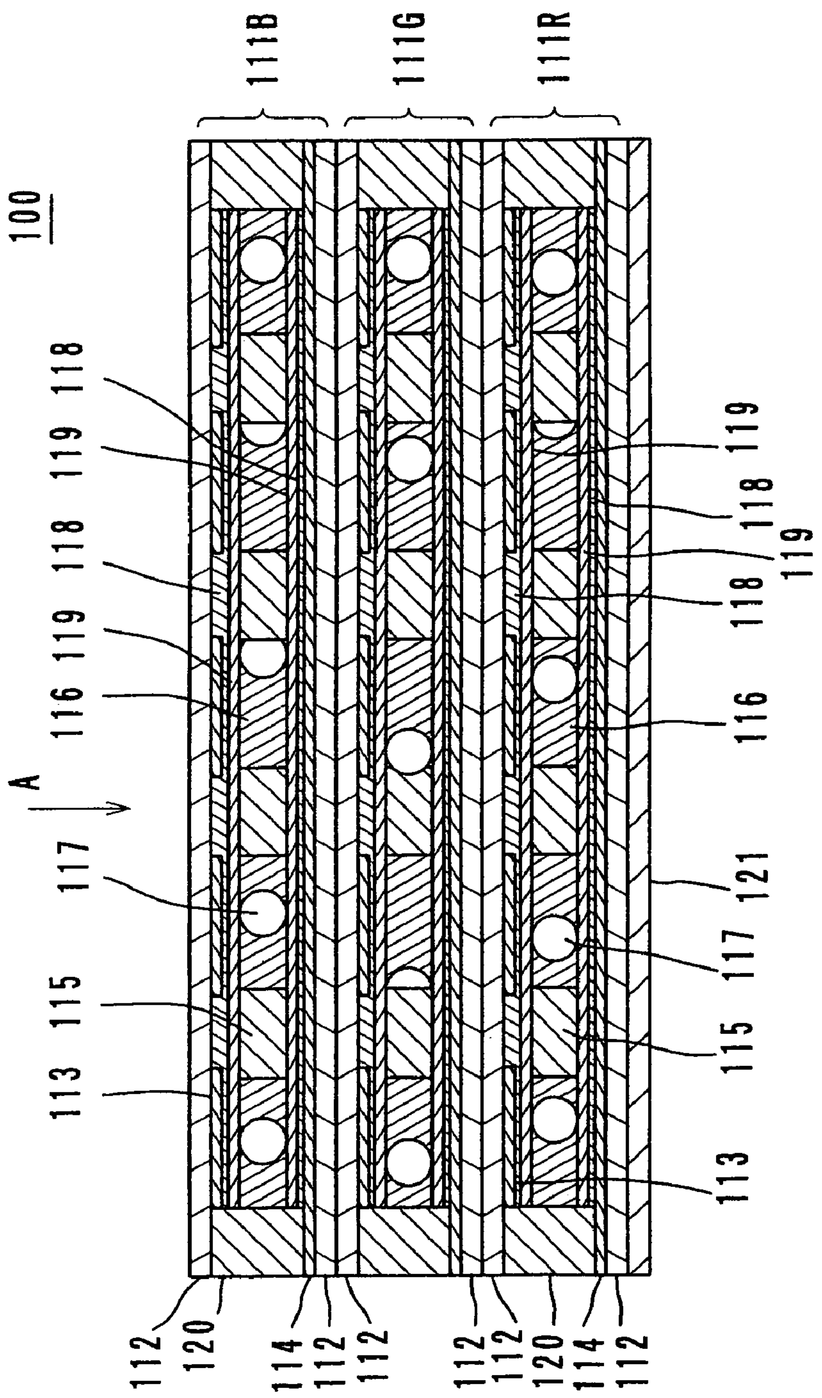

FIG. 1 shows a reflective type full-color liquid crystal display which is driven by a simple matrix driving method. In this liquid crystal display 100, on a light absorbing layer 121, a red display layer 111R, a green display layer 111G and a blue display layer 111B are laminated. The red display layer 111R makes a display by switching between a red selective reflection state and a transparent state. The green display layer 111G makes a display by switching between a green selective reflection state and a transparent state. The blue display layer 111B makes a display by switching between a blue selective reflection state and a transparent state.

Each of the display layers 111R, 111G and 111B has, between transparent substrates 112 on which transparent electrodes 113 and 114 are formed, resin columnar nodules 115, liquid crystal 116 and spacers 117. On the transparent electrodes 113 and 114, an insulating layer 118 and an alignment controlling layer 119 are provided if necessary. Around the substrates 112 (out of a displaying area), a sealant 120 is provided to seal the liquid crystal 116 therein.

The transparent electrodes 113 and 114 are connected to driving ICs 131 and 132 respectively (see FIG. 4), and specified pulse voltages are applied between the transparent electrodes 113 and 114. In response to the voltages applied, the liquid crystal 116 switches between a transparent state to transmit visible light and a selective reflection state to selectively reflect light of a specified wavelength.

In each of the display layers 111R, 111G and 111B, the transparent electrodes 113 and 114, respectively, are composed of a plurality of strip-like electrodes which are arranged in parallel at fine intervals. The extending direction of the strip-like electrodes 113 and the extending direction of the strip-like electrodes 114 are perpendicular to each other, and the electrodes 113 and the electrodes 114 face each other. Electric power is applied between these upper electrodes and lower electrodes serially, that is, voltages are applied to the liquid crystal 116 serially in a matrix, so that the liquid crystal 116 makes a display. This is referred to as matrix driving. The intersections between the electrodes 113 and 114 function as pixels. By carrying out this matrix driving toward the display layers 111R, 111G and 111B serially or simultaneously, a full-color image is displayed on the liquid crystal display 100.

A liquid crystal display which has liquid crystal which exhibits a cholesteric phase between two substrates makes a display by switching the liquid crystal between a planar state and a focal-conic state. When the liquid crystal is in the planar state, the liquid crystal selectively reflects light of a wavelength $\lambda = Pn$ (P: helical pitch of the cholesteric liquid crystal, n: average refractive index). When the liquid crystal display is in the focal-conic state, if the wavelength of light selectively reflected by the liquid crystal is in the infrared spectrum, the liquid crystal scatters light, and if the wavelength of light selectively reflected by the liquid crystal is shorter than the infrared spectrum, the liquid crystal transmits visible light. Accordingly, if the wavelength of light selectively reflected by the liquid crystal is set within the visible spectrum and if a light absorbing layer is provided in the side opposite the observing side of the display, the liquid crystal display makes displays as follows: when the liquid crystal is in the planar state, the liquid crystal display makes a display of the color determined by the selectively reflected light; and when the liquid crystal is in the focal-conic state, the liquid crystal display makes a display of black. Also, if the wavelength of light selectively reflected by the liquid crystal is set within the infrared spectrum and if a light absorbing layer is provided in the side opposite the observing side of the display, the liquid crystal display makes displays as follows: when the liquid crystal is in the planar state, the liquid crystal reflects infrared light but transmits visible light, and accordingly, the liquid crystal display makes a display of black; and when the liquid crystal display is in the focal-conic state, the liquid crystal scatters light, and accordingly, the liquid crystal display makes a display of white.

In the liquid crystal display 100 in which the display layers 111R, 111G and 111B are laminated, when the liquid crystal of the blue display layer 111B and the liquid crystal of the green display layer 111G are in the focal-conic state (transparent state) and when the liquid crystal of the red display layer 111R is in the planar state (selective reflection state), a display of red is made. When the liquid crystal display of the blue display layer 111B is in the focal-conic state (transparent state) and when the liquid crystal of the green display layer 111G and the liquid crystal of the red display layer 111R are in the planar state (selective reflection state), a display of yellow is made. Thus, by setting the display layers 111R, 111G and 111B in the transparent state or in the selective reflection state appropriately, displays of red, green, blue, white, cyan, magenta, yellow and black are possible. Further, by setting the display layers 111R, 111G and 111B in intermediate states, displays of intermediate colors are possible, and thus, the liquid crystal display 21 can be used as a full-color display.

The liquid crystal 116 preferably exhibits a cholesteric phase at room temperature. Especially chiral nematic liquid crystal which is produced by adding a chiral agent to nematic liquid crystal is suited.

A chiral agent is an additive which, when it is added to nematic liquid crystal, twists molecules of the nematic liquid crystal. When a chiral agent is added to nematic liquid crystal, the liquid crystal molecules form a helical structure with uniform twist intervals, and thus, the liquid crystal exhibits a cholesteric phase.

However, the liquid crystal display with a memory effect is not necessarily of this structure. The resin nodules may be of a wall type or may be omitted. It is possible to structure the liquid crystal display layer to be a polymer-dispersed type composite layer in which liquid crystal is dispersed in a conventional three-dimensional polymer net or in which a three-dimensional polymer net is formed in liquid crystal.

Driving Circuit; See FIG. 2

Figure 2:
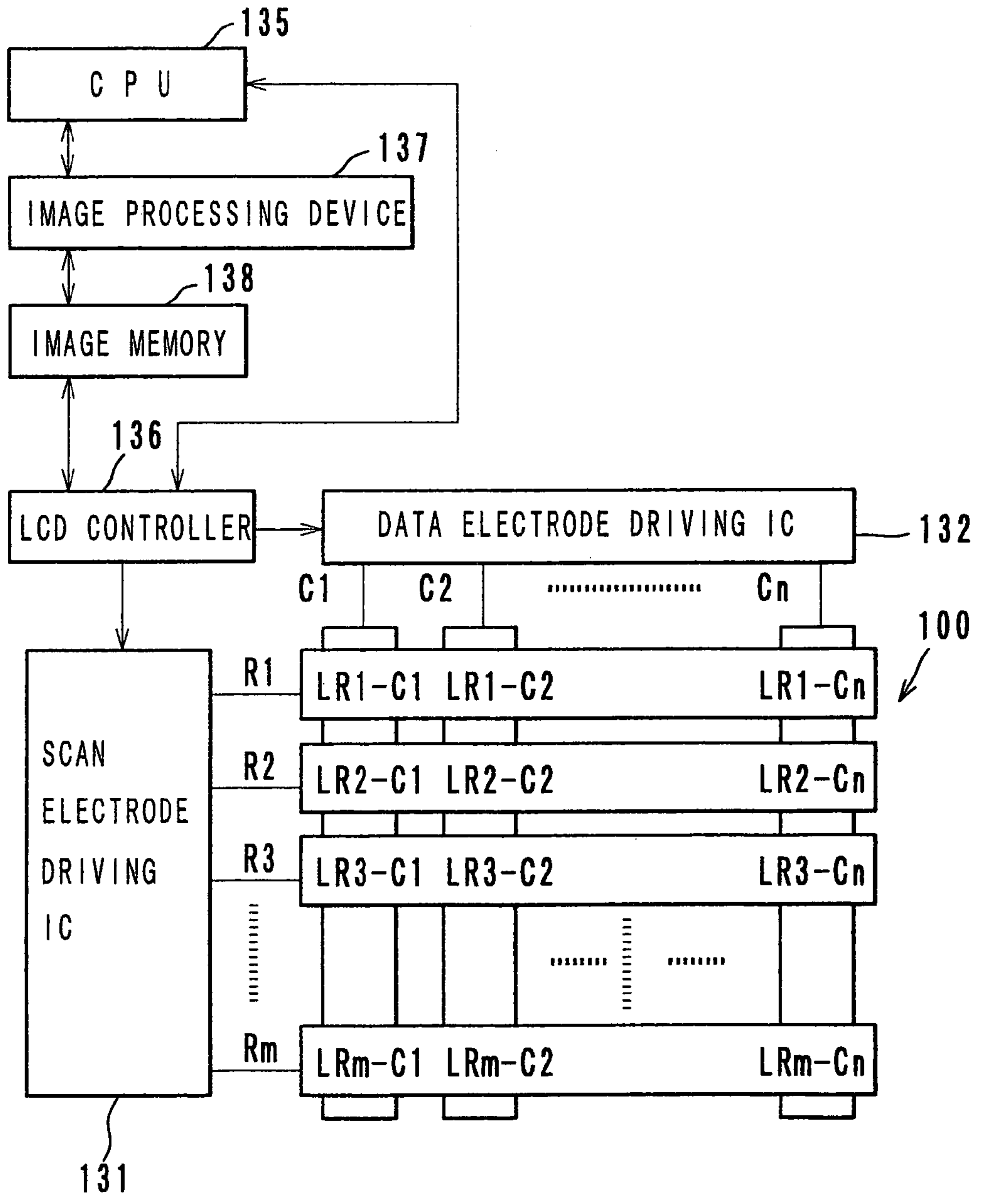
FIG. 2 is a block diagram which shows a driving circuit of the liquid crystal display.

As FIG. 2 shows, the pixels of the liquid crystal display 100 are structured into a matrix which is composed of a plurality of scan electrodes R1, R2, . . . Rm and a plurality of data electrodes C1, C2, . . . Cn (n, m: natural numbers). The scan electrodes R1, R2 . . . Rm are connected to output terminals of a scan electrode driving IC 131, and the data electrodes C1, C2, . . . Cn are connected to output terminals of a data electrode driving IC 132.

The scan electrode driving IC 131 outputs a selective signal to a specified one of the scan electrodes R1, R2, . . . Rm while outputting a non-selective signal to the other scan electrodes R1, R2, . . . Rm. The scan electrode driving IC 131 outputs the selective signal to the scan electrodes R1, R2, . . . Rm one by one at specified time intervals. In the meantime, the data electrode driving IC 132 outputs signals to the data electrodes C1, C2, . . . Cn simultaneously in accordance with image data to write the pixels on the selected scan electrode. For example, while a scan electrode Ra ($a \leqq m$, a: natural number) is selected, the pixels LRa-C1 through LRa-Cn on the intersections of the scan electrode Ra and the data electrodes C1, C2, . . . Cn are written simultaneously. In each pixel, the voltage difference between the scan electrode and the data electrode is a voltage for writing the pixel (writing voltage), and each pixel is written in accordance with this writing voltage.

The driving circuit of the liquid crystal display 100 comprises a CPU 135, an LCD controller 136, an image processing device 137, and an image memory 138 and the driving ICs (drivers) 131 and 132. In accordance with image data stored in the image memory 138, the LCD controller 136 controls the driving ICs 131 and 132. Thereby, voltages are applied between the scan electrodes and the data electrodes of the liquid crystal display 100 serially, so that an image is written on the liquid crystal display 100.

It is preferred to provide three driving ICs 131 and three driving ICs 132 for the respective red, green and blue display layers, that is to provide three driving systems. It is, however, possible that with respect to either the driving IC 131 or the driving IC 132, only a single driving IC is used for the three display layers.

Further, when writing on part of the liquid crystal display, only specified scan electrodes including the part shall be selected. In this way, writing is carried out on only necessary part of the liquid crystal display, which requires a shorter time.

Writing can be carried out in the above-described way. If an image is displayed on the liquid crystal display, preferably, all the pixels are reset to the same state before writing a new image so that the newly written image will not be influenced by the previously displayed image. The reset of all the pixels may be carried out simultaneously or may be carried out serially by scan electrode.

When writing on part of the liquid crystal display, the scanning lines in the part to be subjected to writing may be reset serially by scan electrode or may be reset at one time.

Driving Method; See FIG. 3

Figure 3:
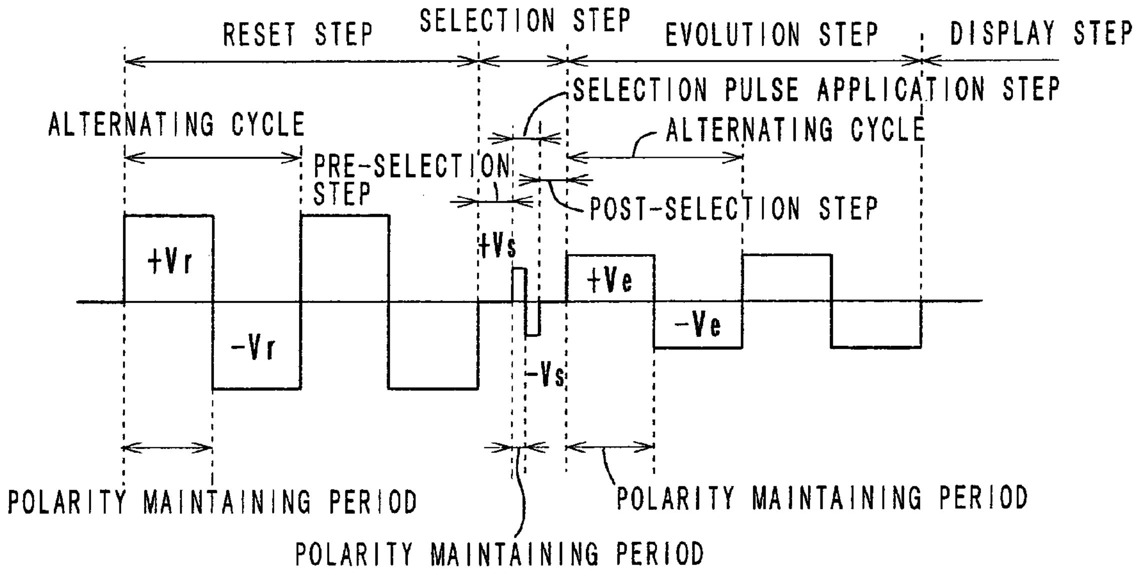
FIG. 3 is a chart which shows a fundamental driving voltage waveform in the method according to the present invention.

First, the principle of a method for driving the liquid crystal display 100 is described. FIG. 3 shows a fundamental voltage waveform applied to liquid crystal in the driving method according to the present invention. The waveform using AC pulses shown in FIG. 3 is only an example, and the driving method according to the present invention does not necessarily use this waveform.

This driving method generally comprises a reset step, a selection step, an evolution step and a display step. In the reset step, the liquid crystal is reset to a homeotropic state. In the selection step, a voltage to select the final state of the liquid crystal is applied. In the evolution step, the liquid crystal is caused to evolve to the selected final state.

As FIG. 3 shows, typically, the reset step is divided into a plurality of alternating cycles, each of which is composed of a positive period and a negative period. In each of the alternating cycles during the reset step, a reset pulse of a voltage $\pm Vr$ is applied to the liquid crystal. Such pulses for one or more cycles are referred to as a reset waveform.

Likewise, the evolution step is divided into a plurality of alternating cycles. In each of the cycles during the evolution step, an evolution pulse of a voltage $\pm Ve$ is applied to the liquid crystal. Such pulses for one or more cycles are referred to an evolution waveform.

In the reset step and in the evolution step, a half of each alternating cycle is a polarity maintaining period.

In the display step, crosstalk pulses which are caused by signals to perform writing on pixels on the other scanning lines are applied. Accordingly, the display step will be also referred to as a crosstalk step in the following paragraphs. The voltage of the crosstalk pulses is smaller than the threshold value to change the state of the liquid crystal. When writing of an image is completed, that is, when all the pixels have gone through the evolution step, the driving ICs 131 and 132 may be stopped so that the voltage applied to the liquid crystal will be 0V.

In the selection step, a selection pulse is applied. The selection pulse is modulated in accordance with image data, that is, depending on whether the pixel is selected to finally come to a planar state, a focal-conic state or an intermediate state between the planar state and the focal-conic state. Further, it is possible to provide break times (pre-selection step and post-selection step) before and after the time of applying the selection step.

Next, the state of the liquid crystal is described. First, in the reset step, the reset waveform is applied to the liquid crystal, and thereby, the liquid crystal is reset to a homeotropic state. The form of the selection pulse to be applied to the liquid crystal in the succeeding selection step depends on whether the liquid crystal is desired to finally come to a planar state or to a focal-conic state.

First, a case of selecting a planar state as the final state of the liquid crystal is described. In this case, in the selection step, an AC selection pulse of a voltage ±Vs is applied to the liquid crystal, and thereby, the liquid crystal is substantially kept in the homeotropic state. A half of the alternating cycle of the selection pulse is a polarity maintaining period. Thereafter, in the evolution step, the evolution waveform is applied to the liquid crystal. By the application of the evolution waveform, the liquid crystal is kept in the homeotropic state.

Further, if the pre-selection step and/or the post-selection step are provided, the liquid crystal comes to a slightly twisted state in these steps; however, the final state of the liquid crystal after the evolution step is the same as that in the case of not providing the pre-selection step and the post-selection step. The merit of providing the pre-selection step and the post-selection step is shortening the application time of the selection pulse, and this results in an increase in the driving speed.

In the display step, 0V or crosstalk pulses which are of a voltage smaller than the threshold value to change the state of the liquid crystal is/are applied to the liquid crystal, and thereby, the liquid crystal comes to a planar state. The liquid crystal in a planar state stays in the state after stoppage of the voltage applied thereto.

Next, a case of selecting a focal-conic state as the final state of the liquid crystal is described. In this case, in the selection step, a selection pulse of which energy is lower than the energy of the selection pulse for selecting a planar state (for example, a selection pulse of a voltage lower than Vs) is applied. Thereby, the liquid crystal is twisted and comes to a transient state in which the helical pitch is widened approximately double.

In a case of selecting a focal-conic state, the selection pulse may be 0. In this case, it can be considered that the voltage of the selection pulse is minimized while the polarity maintaining period is kept. Also, it can be considered that the pulse width of the selection pulse is minimized and accordingly, the polarity maintaining period is minimized.

Thereafter, by application of the evolution waveform, the liquid crystal which has come to a twisted state changes into a focal-conic state. In the display step, as in the case of selecting a planar state, 0V or crosstalk pulses which are of a voltage smaller than the threshold value to change the state of the liquid crystal is/are applied to the liquid crystal. The liquid crystal in a focal-conic state stays in the state after stoppage of the voltage applied thereto.

Thus, the final state of the liquid crystal depends on the selection pulse applied in the selection step. By changing the voltage and the pulse width of the selection pulse, and more specifically by changing the pulse form applied to each of the data electrode in accordance with image data, intermediate tones can be displayed.

From the start of the reset step to the end of the evolution step, the liquid crystal is substantially in a transparent state, and accordingly, the light absorbing layer 121 is seen.

In the driving method according to the present invention shown by FIG. 3, the polarity maintaining periods of the reset pulses applied to the liquid crystal and the polarity maintaining periods of the evolution pulses applied to the liquid crystal are longer than the polarity maintaining period of the selection pulse applied to the liquid crystal. Also, compared with a conventional driving method shown by FIG. 6, the polarity maintaining periods of the reset pulses in the reset step and those of the evolution pulses in the evolution step of the driving method according to the present invention are longer than those of the conventional method, and on the contrary, the number of polarity inversions in the reset step and that in the evolution step of the driving method according to the present invention are smaller than those of the conventional method. In the driving method shown by FIG. 3, there are three polarity inversions in each of the reset waveform and the evolution waveform. (The reset waveform and the evolution waveform each have two alternating cycles, each of which is composed of a positive period and a negative period.) This contributes to a reduction in consumption of electric power. However, such a decrease in number of polarity inversions of the reset waveform and the evolution waveform shall be in an extent in which an occurrence of residual potential (electrical polarization) of the liquid crystal because of ions in impurities contained in the liquid crystal and degradation of the liquid crystal molecules can be prevented. In each of the reset waveform and the evolution waveform, there shall be at least one polarity inversion and preferably two or more polarity inversions. In such a case, by performing the polarity inversions in such a way that the number of positive periods and the number of negative periods of the pulses will be equal to each other, an occurrence of residual potential and degradation of liquid crystal molecules can be prevented more effectively.

Driving Example 1; See FIG. 4

A first example of matrix driving according to the above-described method is described.

Figure 4:
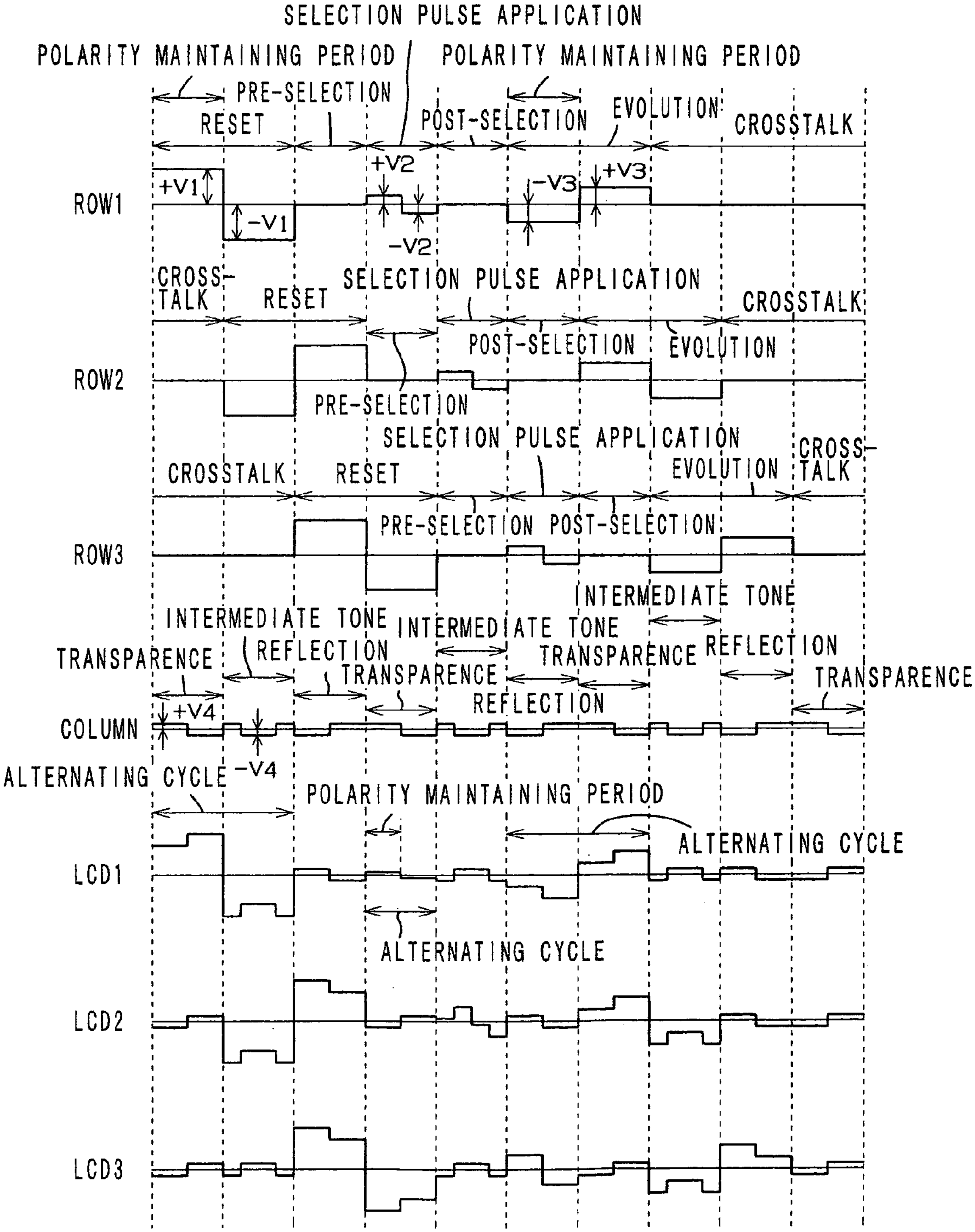
FIG. 4 is a chart which shows a first example of the driving method according to the present invention.

FIG. 4 shows exemplary driving voltage waveforms which act on pixels LCD1, LCD2 and LCD3 which are arranged in a matrix and exemplary pulse waveforms which are applied to scan electrodes (ROW1, ROW2 and ROW3) and to a data electrode (COLUMN) to achieve the driving voltage waveforms. ROW1, ROW2 and ROW3 mean the lines on the scan electrodes, and COLUMN means the line on the data electrode. In this example, a signal which commands transparence, an intermediate tone and total reflection alternately in this order is sent to the data electrode.

In FIG. 4, for simplification, the reset step and the evolution step are twice as long as the step of applying a selection pulse (selection pulse application step). Actually, however, it is preferred that the reset step and the evolution step are long enough that the liquid crystal can be completely reset and can evolve to the selected state correctly, and usually, the reset step and the evolution step are sufficiently long compared with the selection pulse application step, for example, are tens of times as long as the selection pulse application step.

In FIG. 4, for simplification of illustration, only one polarity inversion is illustrated both in the reset step and in the evolution step; however, the number of polarity inversions may be three as shown by FIG. 3 or more, or the number of alternating cycles may be two as shown by FIG. 3 or more.

As described above, in this first example, the selection step is divided into a selection pulse application step, a pre-selection step and a post-selection step which are before and after the selection pulse application step. The length of the pre-selection step and the length of the post-selection step are multiples of the length of the selection pulse application step. In FIG. 4, the length of the pre-selection step and that of the post-selection step are equal to the length of the selection pulse application step.

In this case, to each of the scan electrodes (ROW1, ROW2 and ROW3), a reset voltage ±V1, a selection voltage ±V2 and an evolution voltage ±V3 are applied, and the length of the reset step and the length of the evolution step are multiples of (in FIG. 4, twice) the length of the selection pulse application step. In the display (crosstalk) step, 0V is applied to the scan electrodes. Meanwhile, to the data electrode (COLUMN), a pulse waveform of a voltage ±V4 is applied, and the phases of pulses are shifted in accordance with image data.

In this first example, the form of the selection pulse is determined by the phase and the value of the voltage ±V4 applied to the COLUMN and the selection voltage ±V2. When the voltage ±V4 is in phase with the selection voltage ±V2, the selection pulse of a voltage ±(V2−V4) acts on the pixel, and the pixel is selected to finally come to a transparent state (focal-conic state). When the voltage ±V4 is in inverse phase with the selection voltage ±V2, the selection pulse of a voltage ±(V2+V4) acts on the pixel, and the pixel is selected to finally come to a selective reflection state (planar state). The voltages V2 and V4 are appropriate values to select the transparent state and the selective reflection state, and also, the voltage V4, which acts on the other pixels as a crosstalk voltage, is a value less than a threshold value to change the state of the liquid crystal.

In the first example, lines are scanned at uniform time intervals corresponding to the length of the selection pulse application step. In other words, the length of the selection pulse application step is equal to the scanning time. In a case of providing a pre-selection step and a post-selection step, line scanning may be performed at time intervals corresponding to the length of the selection step including the pre-selection step and the post-selection step. In this case, the length of the selection step is equal to the scanning time.

In FIG. 4, the amplitude of the pulse waveform applied to the scan electrode in the reset step and the amplitude of the pulse waveform applied to the scan electrodes in the evolution step are larger than the maximum amplitude of the pulse waveform applied to the data electrode. In other words, the pulse voltage applied to the data electrode, even at the maximum, is smaller than the pulse voltage applied to the scan electrodes in the reset step and that in the pulse voltage applied to the scan electrodes in the evolution step ($V_1>V_4$, $V_3>V_4$) so that crosstalk will not occur. Therefore, the pulse waveform applied to the scan electrode substantially determines the number of polarity inversions and the length of the polarity maintaining periods of the reset waveform and those of the evolution waveform applied to the pixels (liquid crystal). It is possible to vary the pulse waveforms applied to the scan electrodes independently of each other. By the variation of the pulse waveforms applied to the scan electrodes, the waveforms applied to the pixels can be adjusted line by line in the number of polarity inversions and the length of the polarity maintaining periods.

Figure 6:
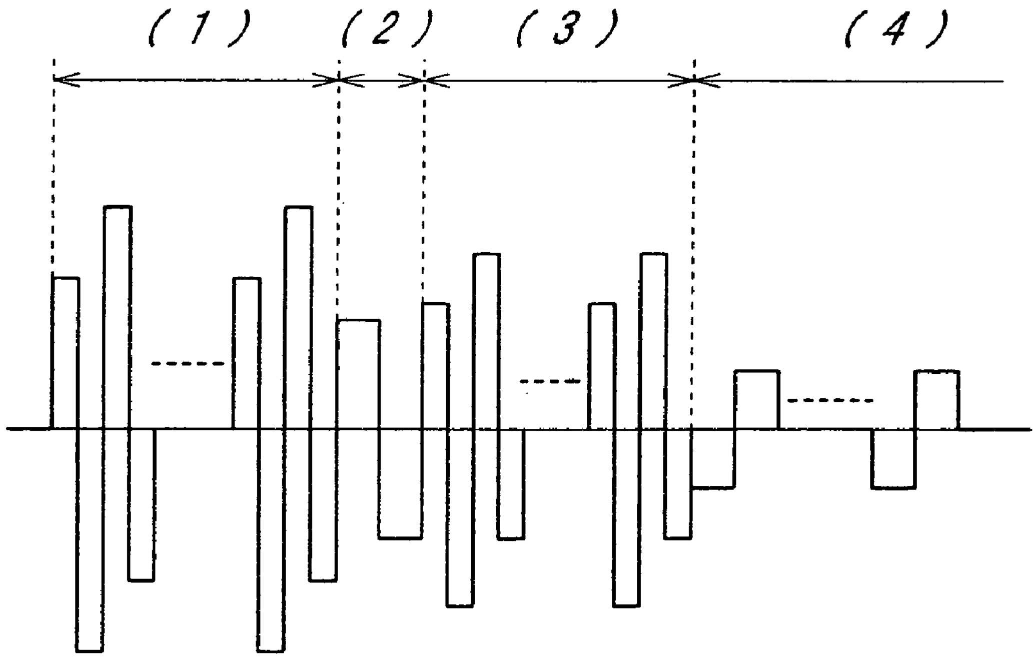
FIG. 6 PRIOR ART
FIG. 6 is a chart which shows a fundamental driving voltage waveform in a conventional driving method.

In the first example, therefore, compared with the driving method shown by FIG. 6, the polarity maintaining periods of the pulses applied to each of the scan electrodes in the reset step are longer than the polarity maintaining period of the selection pulse acting on the liquid crystal in the selection pulse application step, and the polarity maintaining periods of the pulses applied to each of the scan electrodes in the evolution step are longer than the polarity maintaining period of the selection pulse acting on the liquid crystal. Accordingly, the polarity maintaining periods of the reset waveform and the evolution waveform acting on the liquid crystal become longer than the polarity maintaining period of the selection pulse acting on the liquid crystal, and the number of polarity inversions of the reset waveform and the evolution waveform applied to the liquid crystal can be decreased.

Driving Example 2; See FIG. 5

A second example of matrix driving according to the driving method is described.

Figure 5:
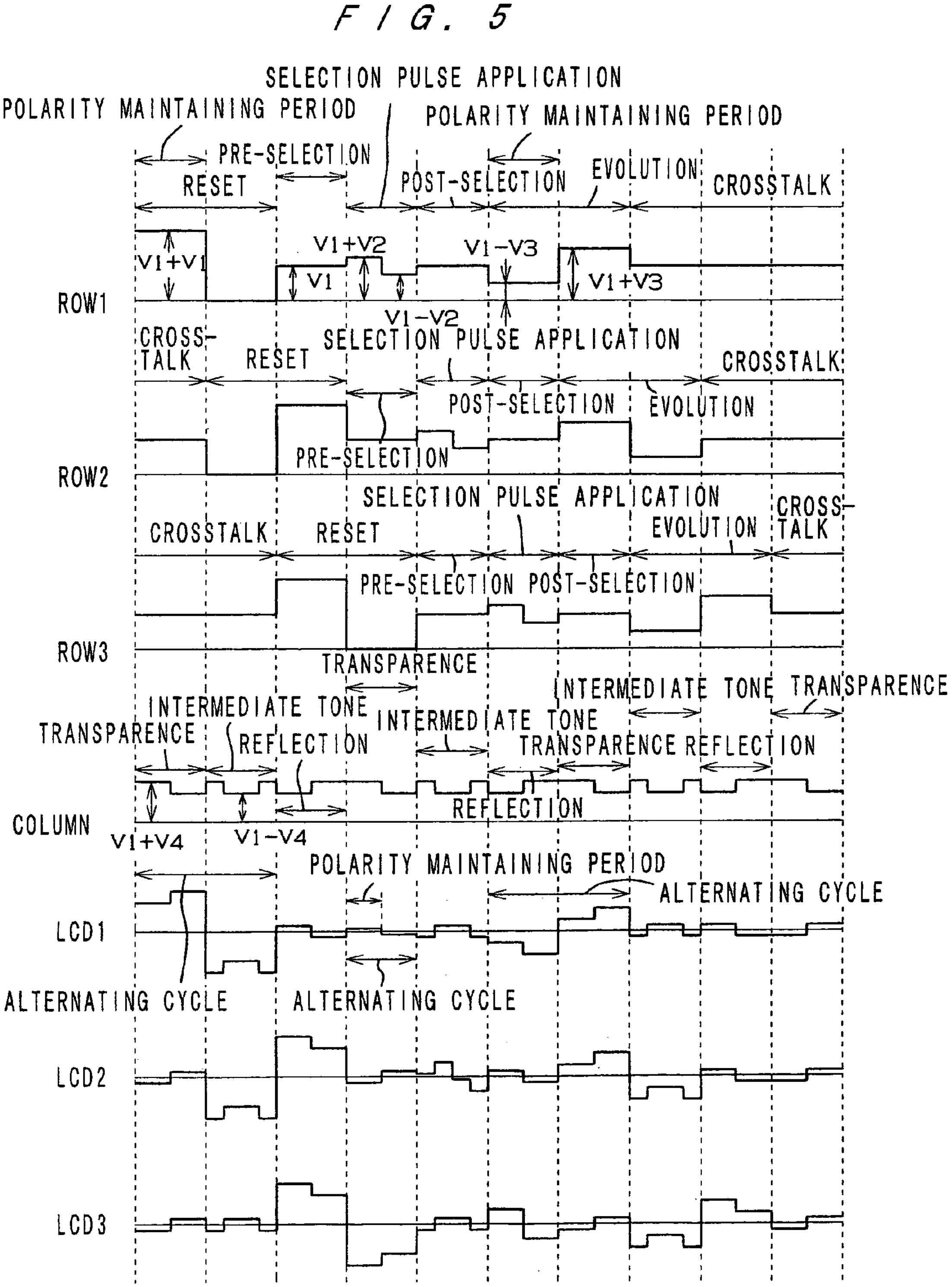
FIG. 5 is a chart which shows a second example of the driving method according to the present invention.

Waveforms applied to the scan electrodes and the data electrode shown in FIG. 5 are achieved by superimposing a voltage V1 on the respective waveforms shown in FIG. 4. In this case, the waveforms acting on the pixels are of the same waveforms as those shown in FIG. 4.

In the second example, the polarity maintaining periods of the pulses applied to each of the scan electrodes in the reset step and the polarity maintaining periods of the pulses applied to each of the scan electrodes in the evolution step are longer than the polarity maintaining period of the selection pulse acting on the pixel in the selection pulse application step. Thereby, the polarity maintaining periods of the reset waveform and the evolution waveform applied to the liquid crystal can be lengthened, and the number of polarity inversions of the reset waveform and the evolution waveform applied to the liquid crystal can be decreased.

Other Embodiments

The structure, the materials, the producing method of the liquid crystal display are arbitrary. The liquid crystal display is not necessarily of the three-layered structure composed of R, G and B layers and may be of a single layer structure. The voltage values and the times of voltage application illustrated as pulse waveforms are merely examples.

In the above embodiments, both the polarity maintaining period of the reset pulse and the polarity maintaining period of the evolution pulse are longer than the polarity maintaining period of the selection pulse acting on the pixel in the selection pulse application step; however, it is possible to set only one of the polarity maintaining periods longer than the polarity maintaining period of the selection pulse.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method for driving a liquid crystal display by applying AC pulses to a liquid crystal layer, which comprises liquid crystal which exhibits a cholesteric phase having a selective reflection characteristic, through a plurality of scan electrodes and a plurality of data electrodes, in which the scan electrodes are selected for scanning successively at specified time intervals, and an image is formed on the liquid crystal display by switching liquid crystal between a focal-conic state and a planar state, said method comprising:

a reset step of applying a reset pulse, which is to reset liquid crystal of the liquid crystal layer to a homeotropic state, to an area of the liquid crystal layer that corresponds to a selected one of the scan electrodes;

a selection step of applying a selection pulse, which is to select a final state of the liquid crystal, to the area of the liquid crystal layer after the reset step, said final state of the liquid crystal being either a focal-conic state or a planar state; and an evolution step of applying an evolution pulse, which is to cause the liquid crystal to evolve to the selected final state, to the area of the liquid crystal layer;

wherein, a pulse applied to the selected one of the scan electrodes during the reset step has an amplitude which is larger than a maximum amplitude of pulses applied to each of the data electrodes and has a polarity maintaining period of a single plus/minus cycle which is longer than that of a single plus/minus cycle of a pulse applied to the selected one of the scan electrodes during the selection step;

a pulse applied to the selected one of the scan electrodes during the evolution step has a polarity maintaining period of a single plus/minus cycle which is longer than that of a single plus/minus cycle of the pulse applied to the selected one of the scan electrodes during the selection step; and a maximum amplitude of the pulses applied to each of the data electrodes is lower than a threshold to change the state of the liquid crystal.

2. The method according to claim 1, wherein:

a pulse applied to the selected one of the scan electrodes during the evolution step has an amplitude which is larger than the maximum amplitude of the pulses applied to each of the data electrodes.

3. The method according to claim 1, wherein the time intervals to select the scan electrodes successively is determined based on a time defined by the pulse applied to the selected one of the scan electrodes during the selection step.

4. The method according to claim 1, wherein the liquid crystal exhibits bistability between a planar state and a focal-conic state.

5. The method according to claim 1, wherein the maximum amplitude of the pulses applied to each of the data electrodes is lower than any pulses applied to the scan electrode.

6. A liquid crystal display device comprising:

a liquid crystal display comprising:

a plurality of scan electrodes;

a plurality of data electrodes; and a liquid crystal layer provided between the scan electrodes and the data electrodes comprises a liquid crystal which exhibits a cholesteric phase having a selective reflection characteristic; and a driver which is connected to the scan electrodes and to the data electrodes, the driver being adapted to scan the liquid crystal display by successively selecting the scan electrodes at specified time intervals and thereby applying AC pulses to an area of the liquid crystal layer corresponding to a selected one of the scan electrodes, the AC pulses comprising:

a reset pulse, which is to reset liquid crystal of the liquid crystal layer to a homeotropic state, applied to the area of the liquid crystal layer during a reset step;

a selection pulse which is to select a final state of the liquid crystal, applied to the area of the liquid crystal layer during a selection step that is subsequent to the reset step; and an evolution pulse, which is to cause the liquid crystal to evolve to the selected final state, applied to the area of the liquid crystal layer during an evolution step that is subsequent to the selection step;

wherein, said selected final state of the liquid crystal is either a focal-conic state or a planar state;

a pulse applied to the selected one of the scan electrodes during the reset step has an amplitude which is larger than a maximum amplitude of pulses applied to each of the data electrodes and has a polarity maintaining period of a plus/minus cycle which is longer than that of a plus/minus cycle of a pulse applied to the selected scan electrode during the selection step;

a pulse applied to the selected one of the scan electrodes during the evolution step has a polarity maintaining period of a plus/minus cycle which is longer than that of a plus/minus cycle of the pulse applied to the selected scan electrode during the selection step; and a maximum amplitude of the pulses applied to each of the data electrodes is lower than a threshold to change the state of the liquid crystal.

7. The liquid crystal display according to claim 6, wherein:

a pulse applied to the selected one of the scan electrodes during the evolution step has an amplitude which is larger than the maximum amplitude of the pulses applied to each of the data electrodes.

8. The liquid crystal display according to claim 6, wherein the time intervals to select the scan electrodes successively is determined based on a time defined by the pulse applied to the selected one of the scan electrodes during selection step.

9. The liquid crystal display according to claim 6, wherein the liquid crystal exhibits bistability between a planar state and a focal-conic state.

10. The liquid crystal display according to claim 6, wherein the maximum amplitude of the pulses applied to each of the data electrodes is lower than any pulses applied to the scan electrode.

* * * * *